March 10, 1970  J. H. LEMELSON  3,499,650
LIGHT PROJECTING AND SENSING DEVICE AND
TARGET PRACTICE APPARATUS
Original Filed July 10, 1959  2 Sheets-Sheet 1
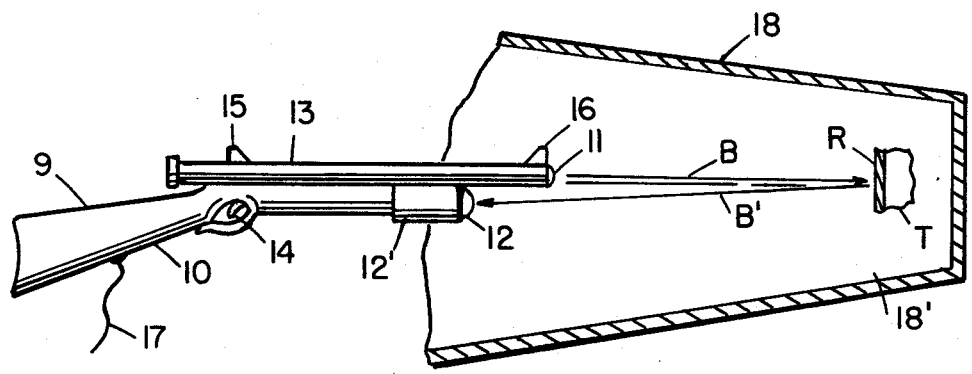
*Fig. 1*
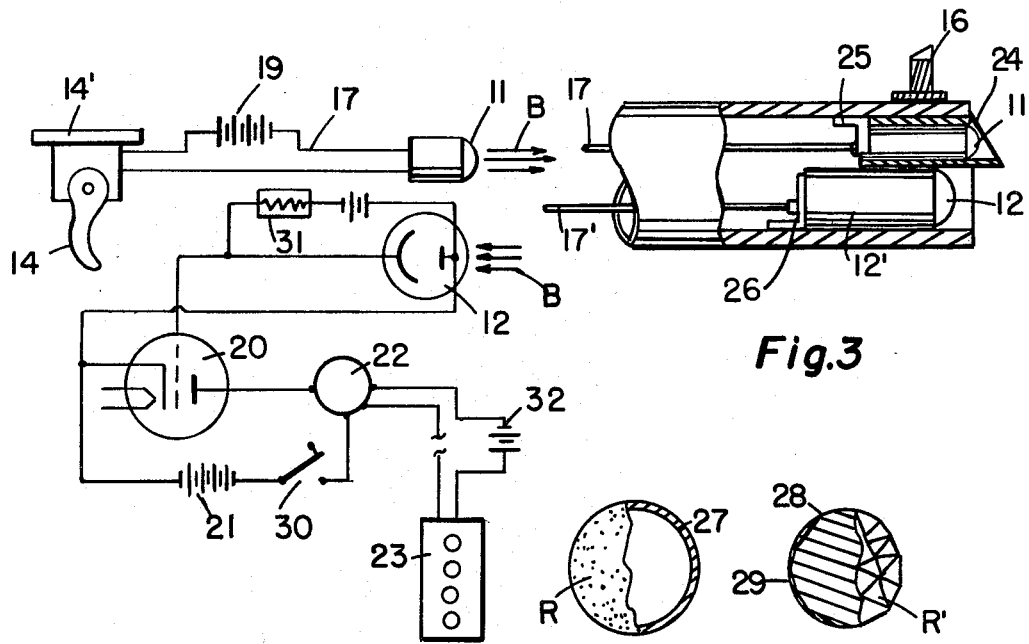
*Fig.2*   *Fig.3*   *Fig.4*   *Fig.5*
INVENTOR.
Jerome H. Lemelson
BY

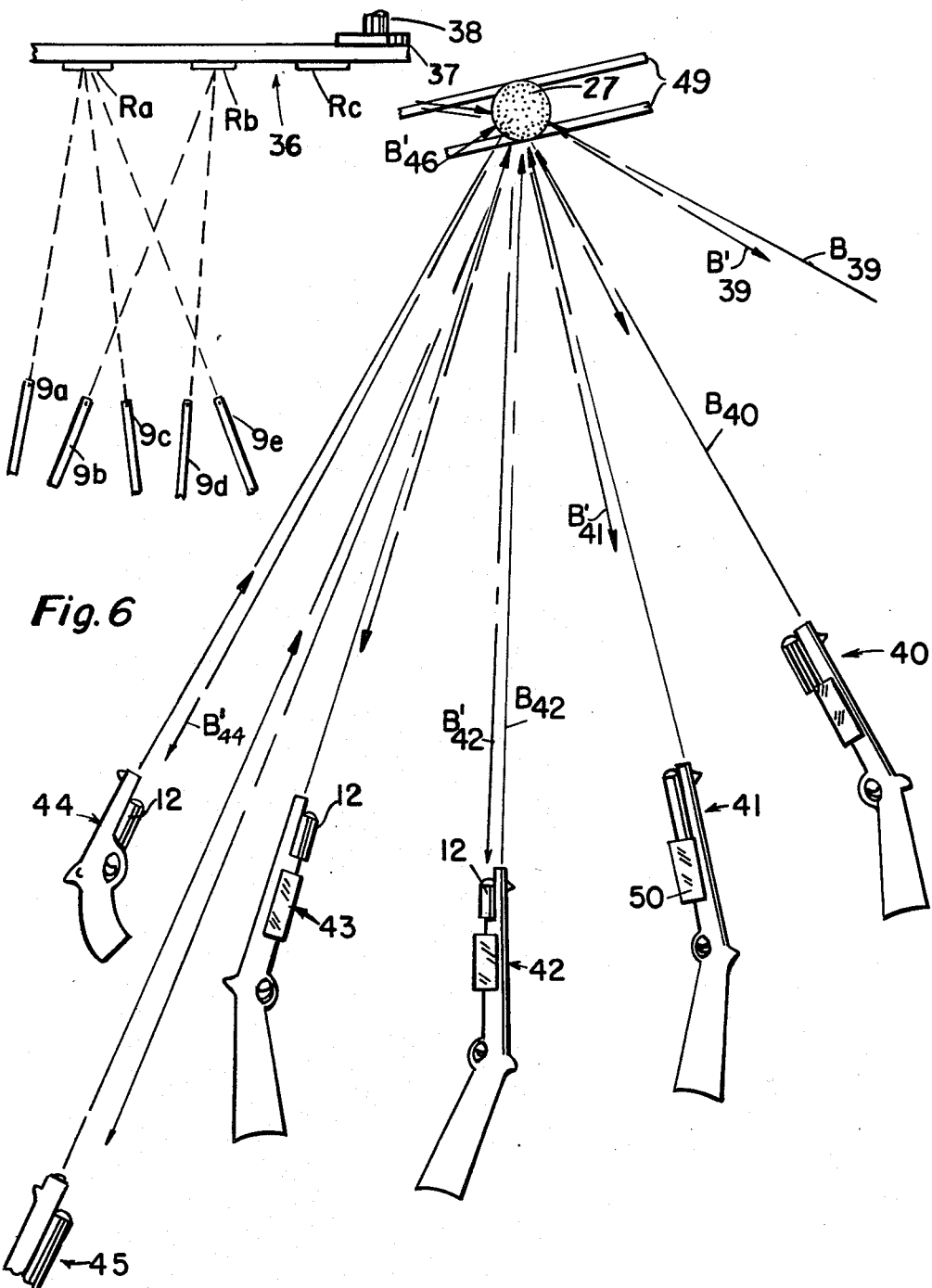

United States Patent Office 3,499,650
Patented Mar. 10, 1970

3,499,650
LIGHT PROJECTING AND SENSING DEVICE AND TARGET PRACTICE APPARATUS
Jerome H. Lemelson, 85 Rector St., Metuchen, N.J. 08840
Continuation of application Ser. No. 826,370, July 10, 1959, which is a continuation-in-part of application Ser. No. 450,131, Aug. 16, 1954. This application Feb. 10, 1966, Ser. No. 526,546
Int. Cl. A63f 9/02
U.S. Cl. 273—101.1
25 Claims

ABSTRACT OF THE DISCLOSURE

A light beam projecting device mounted on a simulated gun with light sensing means which are in position closely adjacent to the light projecting means for sensing the return of light from a reflective target constructed to reflect a light beam incident thereon along a path which is substantially parallel to and closely adjacent the incident beam. A hit-indicating circuit responsive to the receipt of light by said sensing means is connected with said sensing means for actuation thereby.

CROSS REFERENCES TO RELATED APPLICATIONS

This application is a continuation of my prior co-pending application, Ser. No. 826,370, filed July 10, 1959, now abandoned, which was a continuation in part of my prior copending application, Ser. No. 450,131, filed Aug. 16, 1954, and now abandoned.

It is a primary object of this invention to provide a new and improved target apparatus inclduing a target and a means for projecting any form of light energy thereat as a discrete beam, with means for indicating when said beam intersects said target.

Another object is to provide a new and improved target apparatus which utilizes light energy projected from a gun or the like and a target which is a retro-reflector capable of returning said light energy back to its source when intersected thereby. The expressions "retro-reflector" and "reflex reflector" are used herein to designate reflecting devices which are so constructed as to reflect light rays incident thereon along paths parallel to and closely adjacent the paths of incidence.

Another object is to provide electrical target apparatus which includes a simple and low cost target which is a non-electrical device and a gun adapted for projecting a light beam at said target, which gun includes means for indicating when said light beam intersects said target.

Another object is to provide a new and improved photoelectric target apparatus which may be operated at relatively high levels of ambient light including daylight.

Another object is to provide new and improved photoelectric target apparatus including a gun having a light source adapted to project a beam of light in the direction said gun is aimed, said apparatus being operative with said light source beam being at a lower level of light intensity than is used in conventional photoelectric target apparatus.

Still another object is to provide an improved photoelectric target apparatus which includes a target which need not be electrically operated and which may be provided simple enough in structure whereby it may be propelled through the air in free flight.

Another object is to provide an improved photoelectric target apparatus which includes a retro-reflecting target which may be made light enough to be floated on a stream of water or air without any physical connection thereto, said apparatus including means for indicating when a light beam intersects said free-floating target.

Another object is to provide an improved target in the form of a sphere, the exterior surface of which is retro-reflecting, said target adapted to return a light beam projected thereagainst from a source situated in a gun which is part of the apparatus back to the general area of said source, said apparatus including a relay which is responsive to the reflected light and an indicating means which is operated by said relay.

Another object is to provide an improved target apparatus including a plurality of light beam projecting aiming devices or guns, each situated at a different position relative to the target and each containing its own "hit" indicating means, said target being capable of returning light projected from any of said guns back to the vicinity of its source, with sufficient intensity to energize "hit" indicating relay for said gun, and without energizing the relays of the other guns.

Yet another object is to provide a new type of target apparatus having a plurality of guns or the like which may be simultaneously "fired" at the same target, each gun indicating a "hit" regardless of the action of the other guns, without physically changing or destroying the target.

Another object is to provide improved photoelectric target apparatus including a gun or the like with self-contained "firing" and hit indicating means and a plurality of targets which may be selectively fired at from any angle, and which targets are non-electrical and are not damaged or destroyed.

A further object is to provide an improved target apparatus which includes a light beam generating gun and an indicator on said gun for indicating when light energy of substantially the same characteristics as the light beam generated by the gun is present thereat, and a retro-reflecting target surface material applied to a plurality of different moving and stationary targets for returning light beams from said gun back to said indicator.

The invention also consists of certain new and original features of construction and combinations of parts hereinafter set forth and claimed.

The nature of the invention, as to its objects and advantages, the mode of its operation and the manner of its organization, may be better understood by referring to the following description taken in connection with the accompanying drawings forming a part thereof, in which:

FIG. 1 is a side view of a gun and target forming part of the novel target apparatus;

FIG. 2 is a schematic electrical diagram of the light generating and hit indicating means of the apparatus of FIG. 1;

FIG. 3 is a partly cross-sectional, fragmentary view of the end of the barrel of a modified form of gun;

FIG. 4 is a partly cross-sectional view of a spherical retro-reflecting target applicable to the apparatus of this invention;

FIG. 5 is a partly cross-sectional view of another reflecting sphere applicable to the apparatus of this invention;

FIG. 6 is a schematic diagram of target apparatus including a plurality of guns and a plurality of targets made in accordance with the teachings of this invention; and FIG. 7 illustrates diagrammatically a plurality of simulated guns in use with a target like that shown in FIGURE 4 and movable on a track.

DESCRIPTION OF THE PREFERRED EMBODIMENTS

In FIG. 1 are illustrated the basic components of the target apparatus of this invention, which comprise a gun 9 and a target situated remote therefrom and referred to by the notation T. The gun 9 is shown in the shape of a rifle having a stock 10 and a simulated barrel 13 with sights 15 and 16 mounted thereon for aiming said gun.

Situated in the end of the barrel 13 is a light beam generating means 11 which consists of a light source and lens means associated therewith for projecting a beam of light B at the target when said light source is energized.

Target T may be any desired shape and its surface which faces the marksman at the gun 9 is at least partially covered or coated with reflex reflecting material R adapted for returning most of the light of the incident beam B which strikes R as a beam illustrated at B' to the vicinity of the light source 11. Mounted in a housing 12' closely adjacent light projecting means 11, and directly beneath the barrel or common support means 13, is a light sensing means or photoelectric cell and relay 12 adapted to receive light from the reflected beam B'. The relay may be utilized for energizing a scoring means such as a lamp or buzzer. FIGURE 1 shows that housing 12' includes stationary light transmitting means 12 which defines a light path between the exterior of the apparatus and the light sensing means, said path being devoid of moving light intercepting elements.

The light source 11 is preferably an electric lamp in a housing with a built-in lens for projecting a beam of light B at the target T. The light source is in series circuit with a power supply and a switch 14' which is operated by depressing the trigger 14 of the gun. The notation 17 refers to a flexible electric cable containing wires which connect the power supply to the light source 11 and its switch. The photoelectric cell and relay in 12' are connected by wires 17' with an electrically operated "hit" indicating means.

Also shown in FIG. 1 is a fragment of a housing or semiclosure 18 in which the target T may be mounted and which may provide means for controlling the amount of ambient light in the vicinity of said target. While the gun 9 may be pivotally secured to the housing 18 in one form of the invention, a more realistic target range is derived by permitting the operator of the gun complete freedom of movement therewith within the interior volume 18' of the housing. If a light source of relatively high intensity is mounted at the end of the gun, since the reflex reflecting surface of R will return most of said light to the vicinity of the source, the housing 18 need not be utilized to reduce ambient light and the gun may be operated in daylight without continually energizing the relay in the housing 12'. In other words, the photoelectric relay may be adjusted to operate at a light level which is higher than ambient daylight.

It is noted that target devices employing photoelectric relays operating by changes in the light intensity of images cast upon planar surfaces require that the ambient light be considerably reduced and generally employ a darkened room as a target range. As such, they are extremely limited in their application. In contradistinction, the apparatus of FIG. 1 may be operated in brightly lighted rooms or in daylight, provided that the photoelectric cell 12 is not aimed directly at the sun or bright light sources, and hence it is considerably more versatile than the devices of the prior art. The reflex reflector R may be made in accordance with the teachings of such patents as 2,440,584 and 2,354,049 or may comprise a plurality of small spherical lenses made out of glass with an index of refraction on the order of 1.90 or greater and applied to at least part of the surface of T by means of an adhesive and forming a layer or surface which is retro-reflecting. The reflector's range of incidence angles will depend on its characteristics as well as the shape of the surface on which it is provided. If a so called "wide angle" reflex-reflector such as "Scotch-Lite" is utilized on the surface of a flat base member such as the target T of FIG. 1, the extreme positions of the transmitted light beam B generated by the light source of the gun 9 will define an envelope which is a conical surface having an apex angle in excess of 135 degrees, within which envelope the gun may be "fired" at the target with a resulting "hit" being scored by the photoelectric relay of the gun. I have discovered that such a wide angle reflecting surface may be constructed by merely depositing a plurality of glass spheres .005 inch or less in diameter and made of glass having an index of refraction on the order of 1.90 or greater onto an adhesive layer applied to the surface of the target in such a density as to cover at least 50% of the surface to which it is applied.

The operation of the light source, photoelectric relay, and indicating means is illustrated in the schematic diagram shown in FIG. 2. When the trigger 14 of the gun is depressed or squeezed, it operates a normally open switch in housing 14' connecting the light source in housing 11 with a source of electrical energy such as the illustrated battery 19. The switch in 14' may be a so-called override switch which closes momentarily when the trigger 14 is pulled and opens automatically thereafter, thereby projecting a light beam B of short duration at the target T. The switch in 14' may also be one which remains closed as long as the trigger 14 is depressed. A large part of the reflected light bundle B' passes substantially parallel to and closely adjacent to the projected light to the photoelectric cell 12 which is situated adjacent the light source 11 and is adjusted to become energized on receipt of the light. Light falling on the cathode of 12 causes an emission of electrons to the anode thereof and a flow of current. The passage of electrons through the resistor 31 varies the potential of the grid of the tube 20 until its plate current is sufficient to operate the relay 22. Said relay 22 may be an electro-magnetically operated switch or the like which, when so energized, momentarily closes and completes the circuit of an electrical scoring device 23. The notation 32 refers to a source of electrical energy for operating the electrical device 23 which may consist of a buzzer, bell, one or more lights, or a counting mechanism of conventional design. The numeral 21 refers to a power supply across the tube 20 which provides electrical energy for actuating relay 22. The notation 30 refers to a switch adapted for opening the circuit of 21 when the scoring circuit is not in use. Switch 30 may be automatically closed for a predetermined period of time by means of a coin operated switch mechanism of conventional design or may be automatically opened when the switch in 14' has been closed a specific number of times.

Various types of automatic scoring mechanisms which are self-resetting may be employed for indicating the number of times the photo-electric relay 12 is energized, which is indicative of a "hit" on the target. The various power supplies illustrated in FIG. 2 may be combined as one battery which may be mounted on or in the gun 9 or remote therefrom and connected by means of wires in the cable 17 of FIGURE 1.

FIG. 3 illustrates modification of the design of the gun shown in FIG. 1. In FIG. 3 both photoelectric cell and light source are mounted in the end of the barrel and are preferably hidden from view thereby. The light source 11 is shown secured in an opaque shield 24 which is secured to the upper portion of the barrel 13 by means of a bracket 25 which may be welded thereto or held thereagainst with fasteners. The shield 24 prevents light from the source 11 from entering the lens of the photoelectric cell 12 which is mounted in housing 12' positioned directly beneath said light source and held against the bottom wall of the barrel by means of a bracket 26. The members 17, 17' are cables connecting the light source and photocell to the FIG. 2 circuit. The side-by-side arrangement of light source and photoelectric cell of FIG. 3 has, in addition to the advantage of providing a more realistic gun with said components hidden from view, the further advantage in that the photoelectric cell will receive more retroreflected light than one which is mounted further from the axis of the light source 11.

The target employed in the present invention may comprise part of a swinging, rotating or oscillating arm or a simulated mock figure or vehicle. In FIG. 4, I show a target in the form of a thin walled hollow sphere 27, the exterior surface of which is coated or otherwise covered with a reflex reflecting material of the type described, which forms essentially a spherical reflex reflecting surface. If the target 27 is made of light-weight plastic or other material it may be floated on a fluid stream such as a stream of air generated by a fan or a stream of water whereby it bobs up and down in front of the marksman, thereby providing a very dynamic target which need not be knocked out of said stream to indicate a hit. Such a target may be struck by a light beam from most any angle and will return the light to the vicinity of its source, and therefore it need not be prepositioned or held in any particular attitude relative to the marksman. The sphere 27 may also be solid and may be rolled along a track 49 (FIG. 7) or other guide means or shot into the air by a mechanism in front of the marksman and automatically returned to said mechanism to be catapulted again in the same or other directions. The spherical shape of target 27 is ideal for delivering and controlling the movement of the target.

A ball-shaped target 28 is illustrated in FIG. 5, the exterior surface 29 of which is shaped into a plurality of small reflecting surfaces R' which extend in a plurality of different directions for reflecting at least part of the light cast thereon from a light source such as 11 back to the photoelectric cell. While the target 28 of FIG. 5 is not as efficient a reflector as the reflex reflecting spherical target of FIG. 4, the element of chance is introduced when it is used since light may or may not be returned to the photoelectric cell 12, depending on the attitude of the particular reflecting surface struck when said light is projected at said target.

The versatility of the apparatus of FIGS. 1 to 3 is illustrated in FIG. 6 in which a plurality of guns 9a to 9e may be employed, two or more of which may be aimed at the same target or reflex reflecting portion of a target and if the light beam of a respective gun intersects said target it will be reflected back to the vicinity of the muzzle of the gun for scoring a "hit" as heretofore described without energizing the photoelectric relays of the other guns, provided, of course, the guns are not too close together. The wide angle retro-reflecting characteristics of the reflex reflecting surfaces heretofore referred to permit a plurality of guns to be utilized over a wide angle or cone of possible incident rays impinging on a single target. As a result, if the guns are positioned, for example, 20 feet or more away from the target, as many as 4 or 5 guns may be employed with the light from the light source of each cast upon a single reflex reflecting surface without the light from any one source energizing the photoelectric relay of another gun. The guns referred to by the notations 9a, 9c, and 9e are shown with their light beams directed at the reflex reflecting surface Ra on the target 36 and each will have its photoelectric relay energized only by the light reflected from the target which originated at its own light source. The guns 9b and 9d are shown aimed at the reflex target Rb and are not affected by light originating at the other guns. The notation 38 refers to a shaft extending from a servo device such as an electric motor. The shaft is connected to the target base 36, which may be a disc or arm, by means of a flange 37 and may be utilized to rotate or oscillate base 36 and the reflecting target areas Ra, Rb, and Rc mounted thereon to create a dynamic target device which is relatively simple in structure and low in cost.

In FIG. 7 is shown target apparatus consisting of a plurality of guns 40 to 45 which are aimed at a single target such as the spherical target 27 of FIG. 4. The guns need not be situated in the same plane and may be located at any angle relative to the target since the spherical reflex reflecting surface thereof will return to the vicinity of its source light incident thereon at any angle thereto. Each gun contains its own power supply, photoelectric relay and other mentioned components secured in a housing 50 and, as such, may be carried by the marksman to any position without the limitations imposed by cables or wires extending therefrom. The rifle 40 may project an incident beam of light B-40 against the target which returns the beam B-40 thereto. The other guns may similarly project light along incident paths which are referred to by their respective numerical sub-notations, which light will be returned along substantially the path of its projection by the reflex reflecting material of the surface of target 27 without energizing the photoelectric relays of the other guns, provided that the guns are not too closely adjacent each other. Since certain of the marksmen may fire from the prone position, others from a kneeling position, and still others from a standing position, or from different platforms at different elevations in the target area, it can easily be seen how many different marksmen may fire at the same target, each scoring a "hit" only if light from his gun intersects the target. In fact, a marksman may be directly below or above the target or at any angle thereto, including behind the target relative, for example, to the guns 41 and 42.

What is claimed is.

1. Apparatus comprising in combination: a light projecting means, light sensing means, common support means therefor, and circuit means, said light projecting means being mounted on said common support means in position for projecting light away from said common support means to a reflective target, said light sensing means being positioned in a housing on said common support means, said housing including a stationary light transmitting means therein which defines a reflected light path between the exterior of said apparatus and said light sensing means, said path being devoid of moving light intercepting elements, said light sensing means also being closely adjacent said light projecting means and in position for sensing the return from such reflective target to said apparatus of reflected light which is substantially parallel to and closely adjacent said projected light and for actuating said circuit means in response to the receipt of said reflected light, said circuit means being connected with said light sensing means for actuation thereby in response to such reflected light.

2. Apparatus in accordance with claim 1 wherein said common support means includes a common enclosure means having fixed light transmitting means therein, said light projecting means and light sensing means being mounted in said common enclosure means in position for projecting light and receiving light, respectively, through said fixed light transmitting means.

3. Apparatus in accordance with claim 1 wherein said common support means includes manual gripping means for aiming said light projecting means at said target.

4. Apparatus in accordance with claim 1 wherein said light sensing means is a photocell.

5. Apparatus in accordance with claim 1, which includes a target mounted on a movable support, said target being formed to reflect light substantially in the direction of incidence.

6. Apparatus in accordance with claim 1, which includes a target movably mounted upon a track, said target being formed to reflect light substantially in the direction of incidence.

7. Apparatus in accordance with claim 1, which includes a target which is a reflex-reflector so constructed that light rays incident thereon are reflected along paths substantially parallel to and closely adjacent the path of incidence.

8. Apparatus in accordance with claim 7, wherein said reflex-reflector comprises a surface which includes reflex reflecting beads of light transmitting material.

9. Apparatus in accordance with claim 1, wherein a shield is mounted on said common support means intermediate said light projecting means and said light sensing means for shielding said light sensing means from stray light from said light projecting means.

10. Apparatus in accordance with claim 1, wherein said common support means includes two generally cylindrical housings secured in closely adjacent relationship with one another and having apertures therein for the projection and receipt of light by said light projecting means and said light sensing means, respectively, said light projecting means being disposed in one of said housings and said light sensing means being disposed in the other of said housings in generally parallel relationship to said projecting means.

11. Apparatus in accordance with claim 5, wherein said light sensing means is recessed within its housing.

12. Apparatus in accordance with claim 1, wherein said circuit means has its output connected to an indicator which is constructed and arranged to register the actuation of the circuit means.

13. Apparatus in accordance with claim 1, wherein said circuit means includes relay means operable in response to actuation of the circuit means by said light sensing means.

14. In electrical target apparatus, a target formed of a plurality of reflex reflecting particles, an aiming device located remote from said target and adapted to be moved relative thereto, said aiming device including a source of light energy secured thereto, said source of light energy including a trigger operated means for projecting a light beam of short duration toward said target for intersecting said target when said aiming device is in alignment with said target, said reflex reflecting particles defining said target being so formed as to reflect said light back to said source over a path substantially identical to the path of the projected beam when said target has been intersected by said beam of light, light responsive means secured to said aiming device and operatively positioned to receive said reflected light, and means electrically connected to said light responsive means for indicating energization of said light responsive means by the reflected light beam.

15. The target apparatus as set forth in claim 9 wherein said particles comprise spheres each less than .005 inch in diameter and disposed in close proximity to each other on the target surface whereby substantially the amount of light striking said surface is reflected back to said aiming device over a wide range of incidence angles of the projection path from said aiming device.

16. The target apparatus as set forth in claim 15 wherein the target surface is spherical, whereby light striking said spherical surface from any angle will be reflected back to the light responsive means.

17. In electrical target apparatus, a target formed of a plurality of reflex reflecting particles, an aiming device located remote from said target and adapted to be moved relative thereto, said aiming device including a source of radiant energy including means for projecting a beam of energy toward said target for intersecting said target when said aiming device is in alignment with said target, said reflex reflecting particles defining said target being so formed as to reflect said beam of energy back to said source over a path substantially identical to the path of the projected beam when said target has been intersected by said beam of energy, means responsive to said energy secured to said aiming device and operatively positioned to receive said beam of energy after reflection thereof by said target when said target has been intersected by said beam of energy, and means electrically connected to said energy responsive means for indicating energization of said energy responsive means by the reflected energy beam.

18. An electrical target apparatus comprising, in combination with a reflex reflecting target, a gun having a line-of-sight aiming means therefor, a source of light energy fixedly mounted on said gun and movable therewith, said source of light energy including means for transmitting a beam of light along a predetermined projection path relative to said gun, said aiming means including means for aiming said gun for projecting said beam of light at said target substantially parallel to the axis of said line of sight of said aiming means, whereby said beam of light will intersect said target when said target is aligned with said line of sight of said aiming means, a light responsive relay means mounted on asid gun and shielded from the direct rays of said light source, trigger means including a switch operatively connected to said light source whereby a light beam is transmitted along said predetermined projection path when said trigger means is actuated, said reflex reflecting target being so formed as to reflect light back to said gun along a reflection path substantially parallel to and closely adjacent said projection path, said light responsive relay means being mounted closely adjacent said light source along said reflection path for energization in response to receipt of light from said light source which is reflected from said reflex-reflecting target, and automatic hit indicating means connected to said light responsive relay means for indicating a hit when said light responsive means is energized.

19. Electrical target apparatus in accordance with claim 13, including a plurality of said guns, each having a respective line of sight aiming means and a source of light energy fixedly mounted relative to the gun and movable therewith, each of said guns being sufficiently spaced apart from the others whereby the beam of light projected thereby at said target, when reflected from said target, will energize the light responsive relay of the gun from which it originates without energizing the relays of the other guns.

20. An electrical target apparatus in accordance with claim 13, said reflex-reflecting target comprising reflex-reflecting beads.

21. Target apparatus comprising, in combination; an aiming device comprising support means adapted to be pointed at a reflecting target, means on said support means pointable by movement of said support means for projecting a radiant energy beam in the direction of the target, directional radiant energy receiving means on said support means and disposed on a line paralleling the direction of said beam and spaced closely adjacent thereto for receiving and responding to a reflection of said beam of radiant energy, means for energizing said radiant energy beam projecting means, indicating means for indicating reception of reflected radiant energy by said receiving means when said support means is pointed at the target so as to cause reflection of said beam back to said receiving means; and a reflex-reflecting target comprising reflecting means formed for reflecting a projected beam along a path parallel to and closely adjacent the path of the projected beam.

22. Electrical target apparatus in accordance with claim 13, including a plurality of said guns each having a respective line of sight aiming means, a source of light energy fixedly mounted relative to the gun and movable therewith, and means for controlling emission from said source to produce a projected beam of light, with the beams of all of said guns having substantially the same characteristics, each of said guns being sufficiently spaced apart from the others whereby the beam of light projected thereby at said target, when reflected from said target, will energize the light responsive relay of the gun from which it originates without energizing the relays of the other guns.

23. Target apparatus comprising, in combination: an aiming device comprising support means adapted to be pointed at a reflecting target, means on said support means pointable by movement of said support means for projecting a radiant energy beam in the direction of the target, directional radiant energy receiving means on said support means and disposed on a line paralleling the direction of said beam and spaced closely adjacent thereto for receiving and responding to a reflection of said beam of radiant energy, means for energizing said radiant energy beam projecting means, indicating means for indicating reception of reflected radiant energy by said receiving means when said support means is pointed at the target so as to reflect said beam back to said receiving means; and a reflex-reflecting target formed for reflecting a projected beam along a path parallel to and closely adjacent the path of the projected beam.

24. Apparatus in accordance with claim 18, said radiant energy beam projecting means comprising light energy projecting means, said receiving means including photoelectric means and said indicating means being connected to and controlled by said photoelectric means, said photoelectric means being responsive to the reflection of said beam of radiant energy.

25. Apparatus in accordance with claim 19, said aiming device being in the form of a gun including an elongated barrel, a stock for holding said gun, and sighting means mounted on said barrel for aiming said gun, said means for projecting said light energy beam being supported by said barrel and adapted to project said beam in the direction of the longitudinal axis of said barrel, said photoelectric means being supported by said gun, said energizing means including switching means supported by said gun and operative when actuated to cause generation of a pulse of light energy, and finger actuated trigger means supported by said gun and operatively connected to said switching means for actuating same when depressed.

References Cited

"Electronics" for March 1946, pp. 116–119 cited.

DELBERT B. LOWE, Primary Examiner

U.S. Cl. X.R.

250—214, 215, 217